(12) United States Patent
Teshima et al.

(10) Patent No.: US 6,503,384 B1
(45) Date of Patent: Jan. 7, 2003

(54) MICROSTRUCTURE ARRAY, AND METHODS OF FABRICATING A MICROSTRUCTURE ARRAY, A MOLD FOR FORMING A MICROSTRUCTURE ARRAY, AND A MICROLENS ARRAY

(75) Inventors: Takayuki Teshima, Atsugi (JP); Takayuki Yagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/536,128

(22) Filed: Mar. 28, 2000

(30) Foreign Application Priority Data

Apr. 1, 1999 (JP) .................................. 11-094436

(51) Int. Cl.$^7$ ............................ C25D 5/02; B29D 11/00
(52) U.S. Cl. ....................... 205/118; 205/122; 264/2.5
(58) Field of Search ....................... 264/1.1, 2.5, 1.36, 264/1.38; 205/118, 122, 183, 187, 188, 220

(56) References Cited

U.S. PATENT DOCUMENTS

| 5,466,926 A | 11/1995 | Sasano et al. ............... 250/216 |
| 5,536,455 A | 7/1996 | Aoyama et al. .............. 264/1.7 |

FOREIGN PATENT DOCUMENTS

| EP | 0450780 A | 10/1991 |
| JP | 89010169 | 2/1989 |
| JP | 1261601 A | 10/1989 |
| JP | 5303009 A | 11/1993 |
| JP | 6027302 A | 2/1994 |

OTHER PUBLICATIONS

Patent Abstracts of Japan, vol. 1997, No. 02, (Feb. 28, 1997); JP 08258051—Victor Co of Japan Ltd.
Patent Abstracts of Japan, vol. 014, No. 015 (P–989); (Jan. 12, 1990); JP 01261601A—Omron Tateisi Electron Co.
Patent Abstracts of Japan, vol. 018, No. 106 (P–1697); (Feb. 21, 1994); JP 05303009A—Dainippon Printing Co.
Oikawa, et al. "A Distributed–index Planar Micro–lens Made of Plastics", *Japanese Journal of Applied Physics*, vol. 20, No. 1, 1981; pp. L51–L54.
Daly, et al. "The Manufacture of Microlens by Melting Photoresist(*1)", *Microlens Arays*, Ed. M.C. Hurley (1991) pp. 23–34.

*Primary Examiner*—Mathieu D. Vargot
(74) *Attorney, Agent, or Firm*—Fitzpatrick, Cella, Harper & Scinto

(57) ABSTRACT

In a method for fabricating an array of microstructures, a substrate with an electrically-conductive portion is provided, an insulating mask layer is formed on the electrically-conductive portion of the substrate, a plurality of openings are formed in the insulating mask layer to expose the electrically-conductive portion, and a first plated or electrodeposited layer is deposited in the openings and on the insulating mask layer by electro- or electroless-plating, or electrodeposition. At least a surface of the first plated or electrodeposited layer is made electrically conductive. After that, the insulating mask layer is removed, and a second plated layer is formed on the first plated or electrodeposited layer and on the electrically-conductive portion by electroplating to firmly fix the first plated or electrodeposited layer to the substrate.

1 Claim, 9 Drawing Sheets

MICROSTRUCTURE ARRAY, AND METHODS OF FABRICATING A MICROSTRUCTURE ARRAY, A MOLD FOR FORMING A MICROSTRUCTURE ARRAY, AND A MICROLENS ARRAY

BACKGROUND OF THE INVENTION

1. Field of the Invention

The present invention relates to a method for fabricating a microstructure array, a method for fabricating a mold or a master of a mold (in the specification the term "mold" is chiefly used in a broad sense including both a mold and a master of a mold) for forming a microstructure array, a method for fabricating a microstructure array using the mold, and a microstructure array. This invention particularly relates to a mold for forming a microlens array, a method for fabricating the mold, and a method for fabricating the microlens array using the mold.

2. Description of the Related Background Art

A microlens array typically has a structure of arrayed minute lenses each having a diameter from about 2 or 3 microns to about 200 or 300 microns and an approximately semispherical profile. The microlens array is usable in a variety of applications, such as liquid-crystal display devices, optical receivers and inter-fiber connections in optical communcation systems.

Meanwhile, earnest developments have been made with respect to a surface emitting laser and the like which can be readily arranged in an array form at narrow pitches between the devices. Accordingly, there exists a significant need for a microlens array with narrow lens intervals and a large numerical aperture (NA).

Likewise, a light receiving device, such as a charge coupled device (CCD), has been repeatedly decreased in size as semiconductor processing techniques have been developed and advanced. Therefore, also in this field, the need for a microlens array with narrow lens intervals and a large NA is increasing.

In the field of such a microlens, a desirable structure is a microlens with a large light-condensing efficiency which can highly efficiently utilize light incident on its lens surface.

Further, similar desires exist in the fields of optical information processing, such as optical parallel processing-operations, and optical interconnections. Furthermore, active or self-radiating type display devices, such as electroluminescence (EL) panels, have been enthusiastically studied and developed, and a highly-definite and highly-luminous display has been proposed. In such a display, there is a heightened desire for a microlens array which can be produced at a relatively low cost and with a large area, as well as with a small lens size and a large NA.

There are presently a number of prior art methods for fabricating microlenses.

In a prior art microlens-array fabrication method using an ion exchange method (see M. Oikawa, et al., Jpn. J. Appl. Phys. 20(1) L51–54, 1981), a refractive index is raised at plural places in a substrate of multi-component glass. A plurality of lenses are thus formed at the places with a high-refractive index. In this method, however, the lens diameter cannot be large, compared with the intervals between lenses. Hence, it is difficult to design a lens with a large NA. Further, the fabrication of a large-area microlens array is not easy since a large scale manufacturing apparatus, such as an ion diffusion apparatus, is required to produce such a microlens array. Moreover, an ion exchange process is needed for each glass, in contrast with a molding method using a mold. Therefore, variations of lens quality, such as a focal length, are likely to increase between lots unless the management of fabrication conditions in the manufacturing apparatus is carefully conducted. In addition to the above, the cost of this method is relatively high, as compared with the method using a mold.

Further, in the ion exchange method, alkaline ions for ion-exchange are indispensable in a glass substrate, and therefore, the material of the substrate is limited to alkaline glass. The alkaline glass is, however, unfit for a semiconductor-based device which needs to be free of alkaline ions. Furthermore, since a thermal expansion coefficient of the glass substrate greatly differs from that of a substrate of a light radiating or receiving device, misalignment between the microlens array and the devices is likely to occur due to a misfit between their thermal expansion coefficients as an integration density of the devices increases.

Moreover, a compressive strain inherently remains on the glass surface which is processed by the ion exchange method. Accordingly, the glass tends to warp, and hence, a difficulty in joining or bonding between the glass and the light radiating or receiving device increases as the size of the microlens array increases.

In another prior art microlens-array fabrication method using a resist reflow (or melting) method (see D. Daly, et al., Proc. Microlens Arrays Teddington., p23–34, 1991), resin formed on a substrate is cylindrically patterned using a photolithography process and a microlens array is fabricated by heating and reflowing the resin. Lenses having various shapes can be fabricated at a low cost by this resist reflow method. Further, this method has no problems of thermal expansion coefficient, warp and so forth, in contrast with the ion exchange method.

In the resist reflow method, however, the profile of the microlens is strongly dependent on the thickness of resin, wetting conditions between the substrate and resin, and the heating temperature. Therefore, variations between lots are likely to occur while fabrication reproducibility per a single substrate surface is high.

Further, when adjacent lenses are brought into contact with each other due to the reflow, a desired lens profile cannot be secured due to the surface tension. Accordingly, it is difficult to achieve a high light-condensing efficiency by bringing the adjacent lenses into contact and decreasing an unused area between the lenses. Furthermore, when a lens diameter from about 20 or 30 microns to about 200 or 300 microns is desired, the thickness of deposited resin must be large enough to obtain a spherical surface by the reflow. It is, however, difficult to uniformly and thickly deposit the resin material having desired optical characteristics (such as refractive index and optical transmissivity). Thus, it is difficult to produce a microlens with a large curvature and a relatively large diameter.

In another prior art method, an original plate of a microlens is fabricated, lens material is deposited on the original plate and the deposited lens material is then separated. The original plate or mold is fabricated by an electron-beam lithography method (see Japanese Patent Application Laid-Open No. 1 (1989)-261601), or a wet etching method (see Japanese Patent Application Laid-Open No. 5 (1993)-303009). In these methods, the microlens can be reproduced by molding, variations between lots are unlikely to occur, and the microlens can be fabricated at a low cost. Further, the problems of alignment error and warp due to the difference in the thermal expansion coefficient can be solved, in contrast to the ion exchange method.

In the electron-beam lithography method, however, an electron-beam lithographic apparatus is expensive and a large investment in equipment is needed. Further, it is difficult to fabricate a mold having a large area more than 100 cm$^2$ (100 cm-square) because the electron beam impact area is limited.

Further, in the wet etching method, since an isotropic etching using a chemical action is principally employed, an etching of the metal plate into a desired profile cannot be achieved if the composition and crystalline structure of the metal plate vary even slightly. In addition, etching will continue unless the plate is washed immediately after a desired shape is obtained. When a minute microlens is to be formed, a deviation of the shape from the desired one is possible due to etching lasting during a period from the time a desired profile is reached to the time the microlens is reached.

Figure 1A:
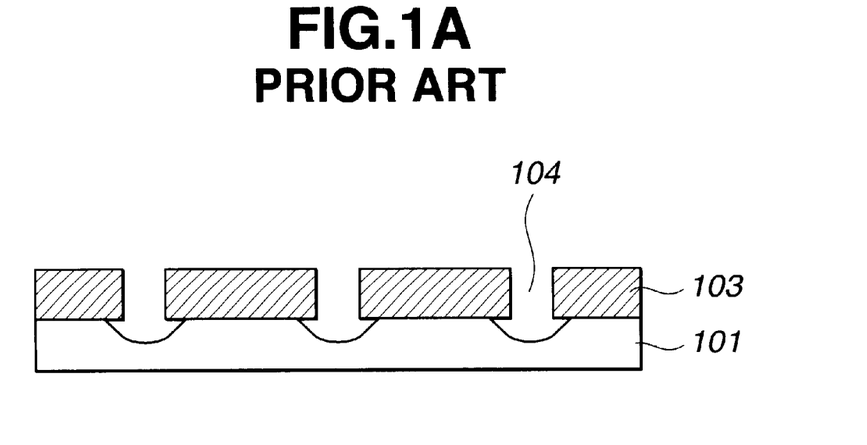
FIGS. 1A and 1B are cross-sectional views illustrating a conventional method of fabricating a microstructure array, respectively.
Figure 1B:
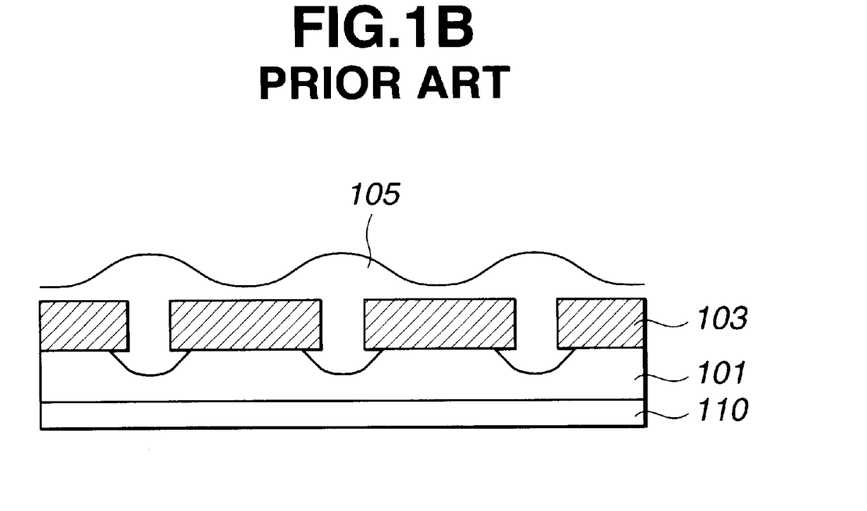
Figure 2A:
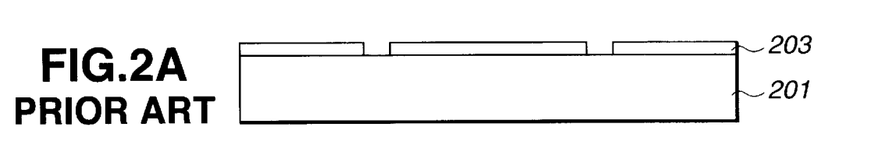
FIGS. 2A to 2D are cross-sectional views illustrating another conventional method of fabricating a microstructure array, respectively.
Figure 2B:
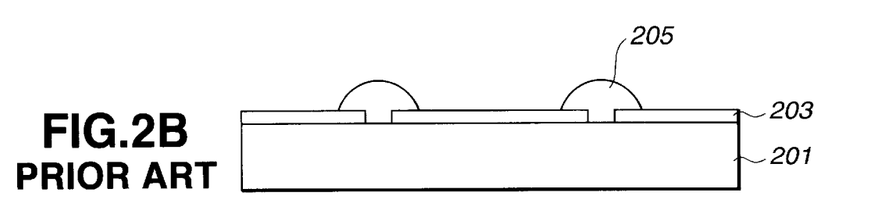
Figure 2C:
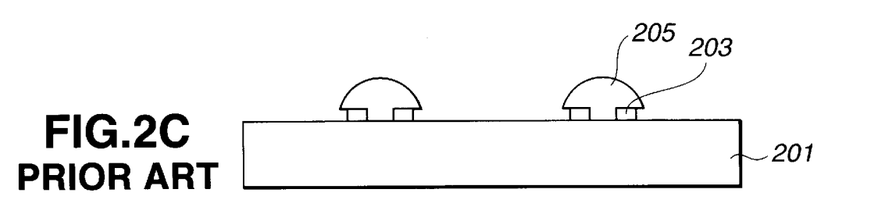
Figure 2D:
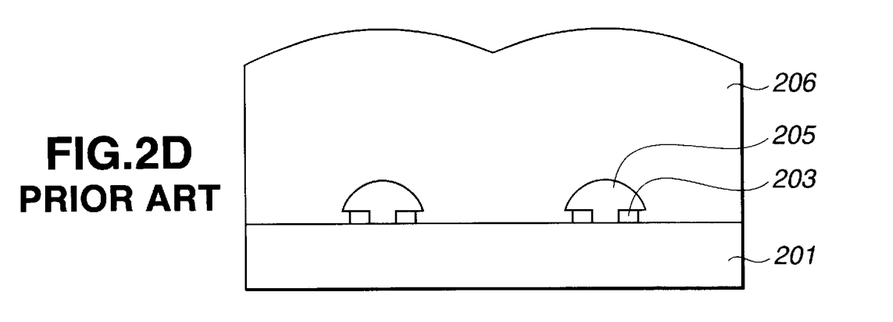

Further, there also exists a mold fabrication method using an electroplating technique (see Japanese Patent Application Laid-Open No. 6 (1994)-27302). In this method, as illustrated in FIGS. 1A and 1B, an insulating film 103 having a conductive layer 101 formed on one surface thereof and an opening 104 is used, the electroplating is performed with the conductive layer 101 acting as a cathode, and a protruding portion or plated layer 105 acting as a mother mold for a lens is formed on a surface of the insulating film 103. A resist layer 110 is formed on the other surface of the conductive layer 101 to prevent the formation of a plated layer on this surface. The process of fabricating the mold by this method is simple, and cost is reduced.

In the method of FIGS. 1A and 1B, the diameter of the opening 104 needs to be less than 20 or 30 microns when a minute microlens of about 20 or 30 microns in diameter is required to be fabricated. In such a case, since a contact area between the plated layer 105 and the conductive layer 101 is small, there is a great fear that the protruding portion 105 falls due to a shearing stress occurring between those layers 101 and 105 when a lens or mold is formed by this structure. An anchor portion is provided in a bottom portion of the plated layer 105 to prevent that falling, but this is not enough to solve the problem.

There exists another mold fabrication method using the electroplating technique (see Japanese Patent Publication No. 64 (1989)-10169). In this method, as illustrated in FIGS. 2A to 2D, after a convex plated layer 205 is formed, a photoresist insulating layer 203 is removed, except its portion between the plated layer 205 and an electrode layer 201, and another plated layer 206 is thickly formed on the plated layer 205 and the electrode layer 201 to form a mold. There is, however, a fear that the mold deforms or cracks occur in the mold when heating of transparent resin to be molded and pressure molding are repeatedly conducted using the thus-fabricated mold. Those phenomena are due to the fact that thermal and mechanical strains tend to be accumulated since mechanical characteristics, such as Young's modulus and yielding strength, of the photoresist 203 left between the plated layer 205 and the electrode layer 201 are far smaller than those of the other elements, and the fact that the molecular weight of high polymer resin, such as the photoresist, tends to be lowered and hence the resin is gasified.

SUMMARY OF THE INVENTION

An object of the present invention is to provide a fabrication method for fabricating a microstructure array (typically a microlens array such as a semispherical microlens array, a flyeye lens and a lenticular lens) with a high resistivity flexibly, readily and stably, a fabrication method of a mold for forming a microstructure array, a fabrication method of a microstructure array using the mold, and so forth.

The present invention is generally directed to a fabrication method for fabricating an array of microstructures which includes the following steps:

preparing a substrate with an electrically-conductive portion;

forming an insulating mask layer on the electrically-conductive portion;

forming a plurality of openings in the insulating mask layer to expose the electrically-conductive portion;

forming a first plated or electrodeposited layer in the opening and on the insulating mask layer by electro- or electroless-plating or electrodeposition, with at least a surface of the first plated or electrodeposited layer being electrically conductive;

removing the insulating mask layer; and forming a second plated layer on the first plated or electrodeposited layer and on the electrically-conductive portion by electroplating.

More specifically, the following constructions are possible based on the above fundamental construction.

The step of forming the first plated or electrodeposited layer may be stopped after a thickness or height of the first plated or electrodeposited layer (i.e., the distance between the exposed electrically-conductive portion and the top of the first plated layer) reaches half a designed final height or more of the second plated layer above a central portion of the opening.

When the electroplating is performed after the mask layer of insulating material such as resist is removed, the cathode is composed of the electrically-conductive portion and the first plated or electrodeposited layer. In such a case, a current tends to be concentrated on a top portion of the first layer, and hence, the semispherical or semicylindrical profile of the plated layer is likely to be deformed. Further, the height of the plated layer is likely to differ between a peripheral portion of its array and a central portion of its array. In contrast, when the electroplating is performed with the mask layer present, the cathode is composed of the plated or electrodeposited layer only. In such a state, an approximately uniform current density can be obtained over the semispherical or semicylindrical plated or electrodeposited layer. Therefore, it is preferable to form the plated or electrodeposited layer with a desired profile under the condition that the mask layer is present, as far as possible. For this purpose, the first-layer forming step is continued after its thickness reaches or exceeds half a designed final height of the second plated layer above the central portion of the opening (i.e., the distance between the exposed electrically-conductive portion and the top of the second plated layer). In this case, the height of the plated or electrodeposited layer is proportional with a curvature radius thereof.

The first plated or electrodeposited layers may be formed in the step of forming the first plated or electrodeposited layer such that the insulating mask layer between the adjacent first plated or electrodeposited layers is not completely covered.

The step of forming the second plated layer may be stopped after a thickness of the second plated layer (i.e., the distance between the top of the first plated layer and the top of the second plated layer) reaches a thickness of the insulating mask layer or more. This is needed to completely fill the space created by the removal of the mask layer with the second plated layer and to firmly fix the first layer to the substrate.

The opening may have a circular shape and the microstructure may be a semispherical microstructure, or an elongated, striped shape, and the microstructure may be a semicylindrical microstructure.

The fabrication method may further include a step of forming a mold on the the substrate with the first plated or electrodeposited layer and the second plated layer, and a step of separating the mold from the substrate. In this case, the mold may be formed using electroplating, and the mold may be a mold for fabricating a microlens array.

In this method, the mold can be directly formed by electroplating or the like. Therefore, no expensive equipment is needed, costs can be reduced, and the size of the mold can be enlarged readily. Furthermore, the size of the plated layer can be controlled in situ, and the lens diameter and the like can be readily and precisely controlled by controlling electroplating time and temperature.

The fabrication method may further include a step of coating a light-transmitting material on the mold, a step of hardening the light-transmitting material, and a step of separating the material from the mold to obtain the microlens array.

The present invention is also directed to a microstructure array including:

a substrate having an electrically-conductive portion;

a first plated or electrodeposited layer formed on the electrically-conductive portion by electro- or electroless-plating or electrodeposition using a plurality of openings formed in an insulating mask layer formed on the electrically-conductive portion of the substrate to expose the electrically-conductive portion, at least a surface of the first plated or electrodeposited layer being electrically conductive, and the insulating mask layer being finally removed; and a second plated layer formed on the first plated or electrodeposited layer and on the electrically-conductive portion by electroplating.

More specifically, the following structures are possible based on the above fundamental structure.

A height of the second plated layer formed on the first plated or electrodeposited layer above a central portion of the opening (i.e., the distance between the exposed electrically-conductive portion and the top of the second plated layer) may be in a range from 1 $\mu$m to 100 $\mu$m.

A thickness of the second plated layer formed on the first plated or electrodeposited layer above a central portion of the opening (i.e., the distance between the top of the first plated layer and the top of the second plated layer) may be equal to or smaller than a thickness or height of the first plated or electrodeposited layer above the central portion of the opening (i.e., the distance between the exposed electrically-conductive portion and the top of the first plated layer).

The first plated or electrodeposited layers may be formed so as not to completely cover the electrically-conductive portion.

A thickness of the second plated layer may be equal to or larger than a spacing between the first plated layer and the electrically-conductive portion.

These advantages and others will be more readily understood in connection with the following detailed description of the more preferred embodiments in conjunction with the drawings.

DESCRIPTION OF THE PREFERRED EMBODIMENTS (First Embodiment)

A first embodiment of a fabrication method of a semispherical microstructure array will be described by reference to FIGS. 3A to 3F.

Figure 3A:
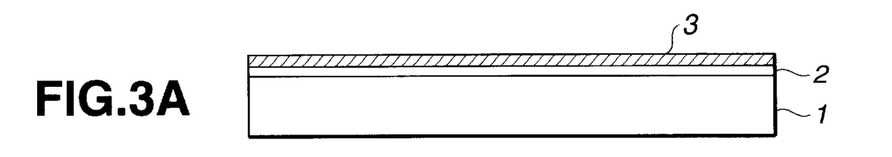
FIGS. 3A to 3F are cross-sectional views illustrating steps of a method for fabricating a mold for a microstructure array, such as a microlens array, and of embodiments according to the present invention, respectively.

Initially, a silicon wafer of 1 inch in diameter is thermally oxidized using an oxidizing gas, and layers of silicon dioxide with a thickness of 1 $\mu$m are formed on opposite surfaces of the wafer. This wafer is used as a substrate 1 illustrated in FIGS. 3A to 3F. Cr and Au are continuously layered with thicknesses of 10 nm and 200 nm on the above wafer, respectively, using an electron beam vacuum-evaporation method which is one suitable thin-film forming method. An electrode layer 2 is thus formed. Aromatic polyamide acid solution is then spin-coated and this coating is thermally treated to form a mask layer 3 of polyimide with a thickness of 1 $\mu$m as illustrated in FIG. 3A.

Any material, such as metal, semiconductor (a silicon wafer or the like) and insulating substance (such as glass, quartz and polymer film), can be used as the substrate material. When the metal material is used as the substrate 1, there is no need to form the electrode layer 2. Further, when the semiconductor is used, the electrode layer is not necessarily needed if the semiconductor has enough conductivity to enable electroplating. However, where metal or semiconductor is used as the substrate, a plated layer will also be formed on a portion other than the microstructure forming portion, since the entire substrate is immersed in electroplating liquid. Therefore, when the plated layer is desired to be formed on a predetermined portion only, the insulating substance can be preferably used as the substrate. Alternatively, a metal or semiconductor, whose surface is partially insulated, may also be used.

Materials of the electrode layer and the substrate are selected from materials which are not corrosive to the electro- or electroless-plating or electrodepositing solution used since the electrode layer is exposed to such a solution. The mask layer 3 may be formed of any inorganic or organic insulating material that is also anticorrosive to the electro- or electroless-plating or electrodepositing solution.

Figure 3B:
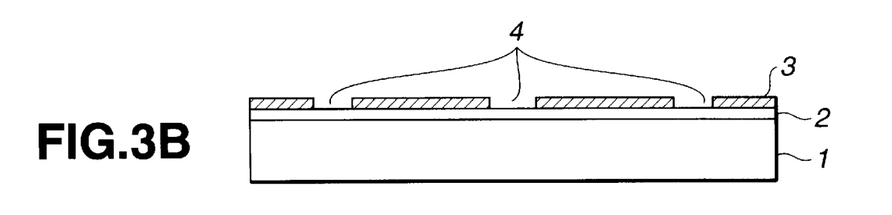
Figure 3C:
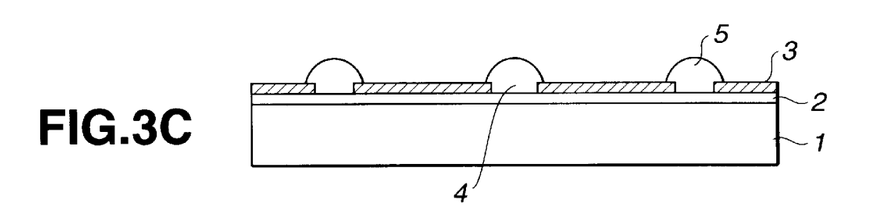

Further, coating, exposure and development of photoresist are conventionally performed using photolithography to form an opening in the resist. The mask layer 3 at the resist opening is etched by a reactive ion etching using oxygen. Thus, the electrode layer 2 is exposed and an opening 4 is formed as illustrated in FIG. 3B. The photoresist is removed thereafter. When the mask layer 3 is formed of photoresist, the above etching process can be omitted.

As formed, the opening 4 has a circular shape and a diameter of 10 $\mu$m. A plurality of the openings 4 are formed in a two-dimensional matrix array of 500×500. Intervals between the adjacent openings 4 are 50 $\mu$m.

Figure 8:
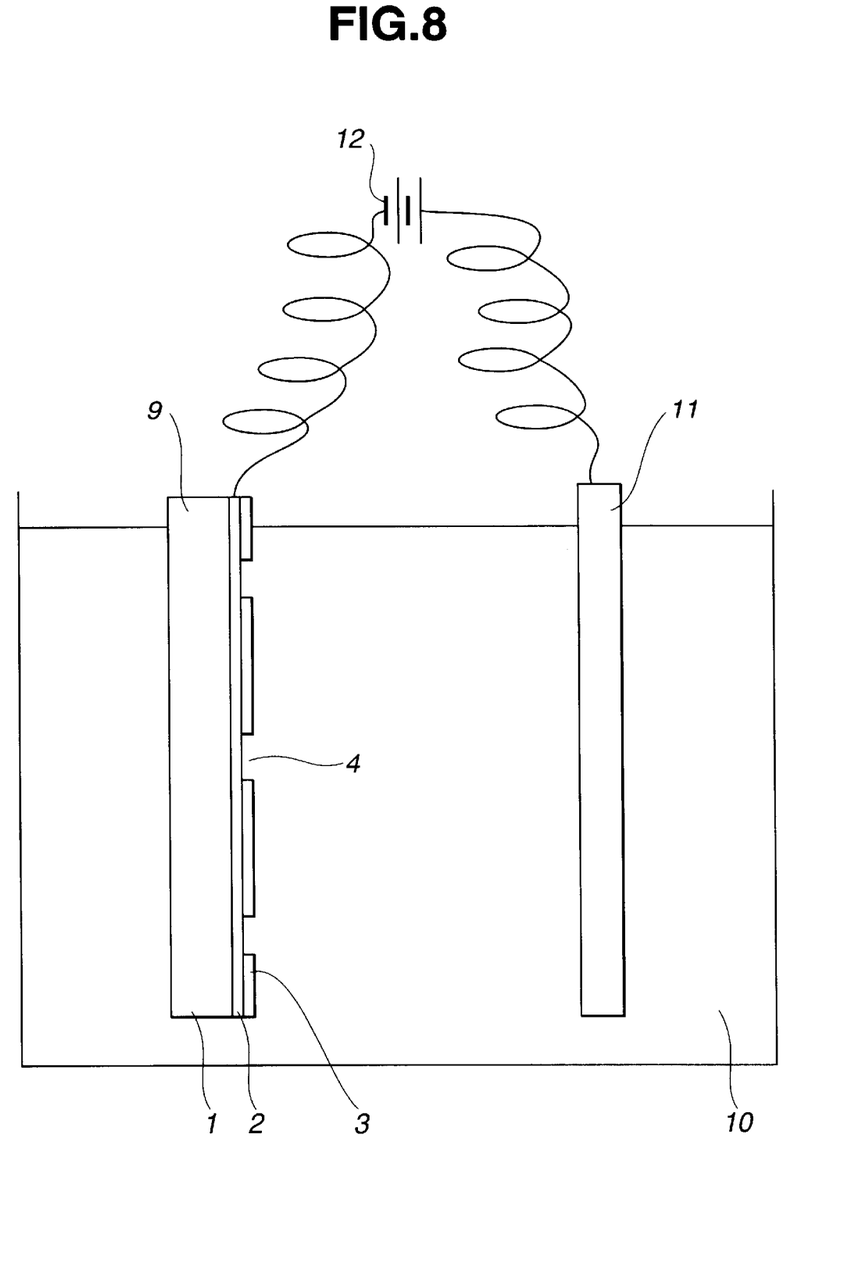
FIG. 8 is a view illustrating an electroplating apparatus used in the fabrication method of the present invention.
Figure 9:
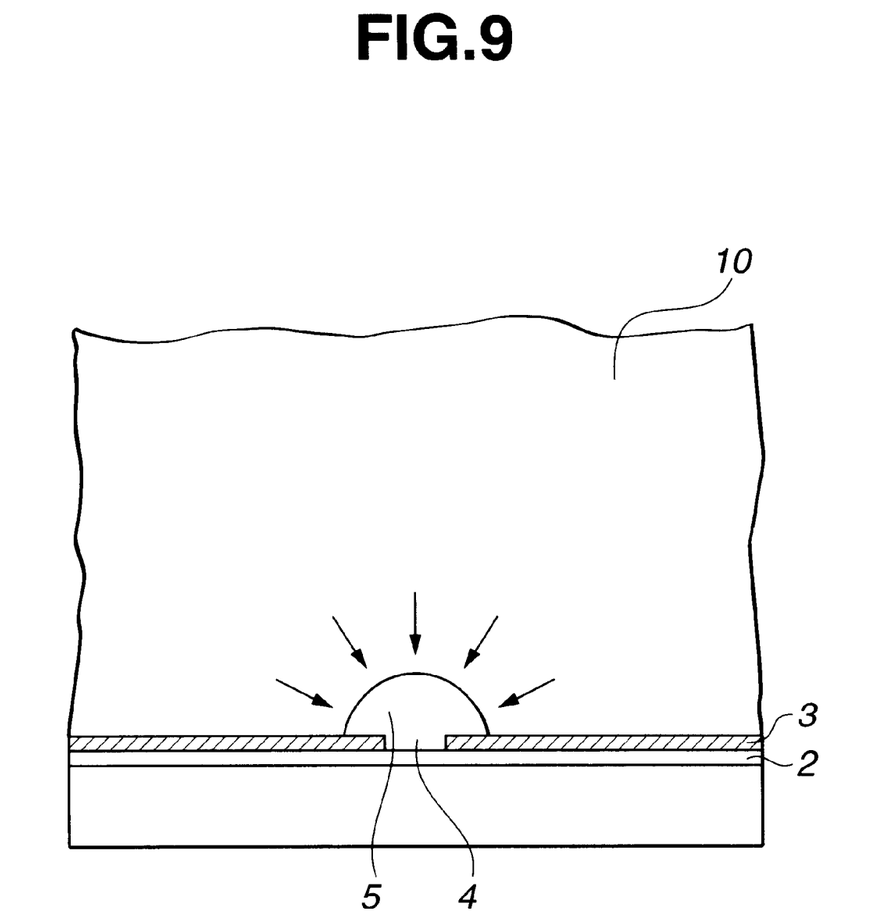
FIG. 9 is a view illustrating a principle of forming a semispherical microstructure by electro- or electroless-plating or electrodeposition.

Ni (nickel) electroplating is then performed at a bath temperature of 50° C. and a cathodic current density of 5 A/dm$^2$ as illustrated in FIG. 8. The above substrate 1 for electroplating is used as a base 9, and the electrode layer 2 is used as the cathode. Ni electroplating bath 10 containing nickel (II) sulfate, nickel (II) chloride, boric acid and brightener is used. An external electric power source 12 is connected between the electrode layer 2 and an anodic plate 11.

Figure 3D:
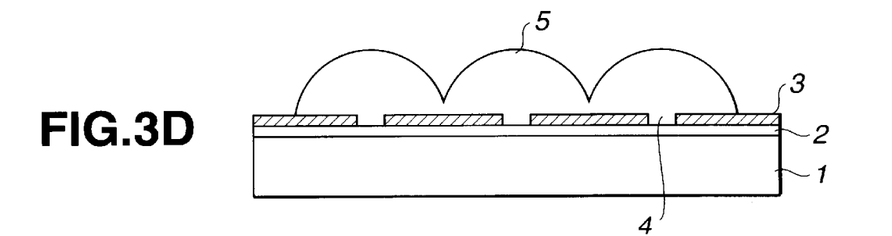
Figure 4:
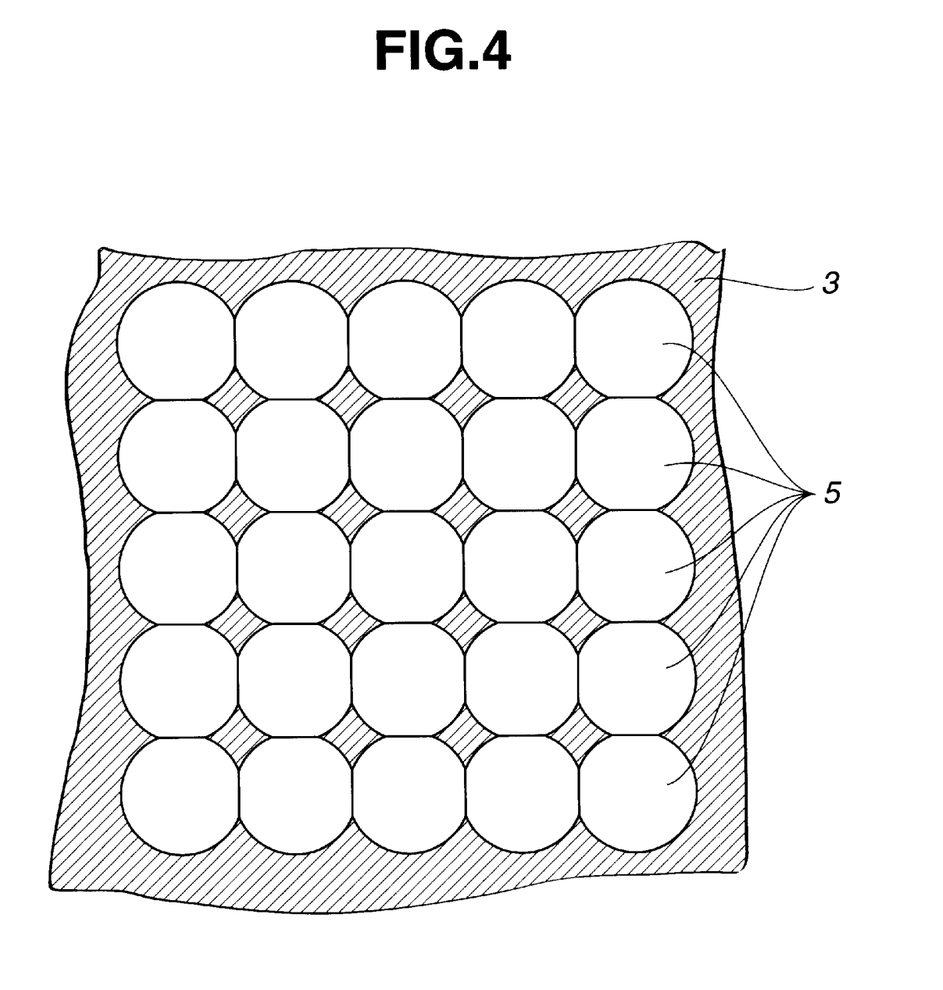
FIG. 4 is a plan view illustrating a state in which a radius in a horizontal direction of a plated layer grown from an opening reaches above a half of an interval between adjacent plated layers.

Ni plated layer 5 is initially deposited in the opening 4 and grown therein. The plated layer 5 expands onto the mask insulating layer 3, and the semispherical microstructure 5 is thus formed as illustrated in FIG. 3D. The plated layer 5 is deposited until its radius reaches about 25 $\mu$m above a center of the opening 4. FIG. 4 shows a plan view of FIG. 3D.

Where the electroplating is effected at the opening 4 in the electroplating solution 10 containing metal ions, metal ions in the electroplating solution 10 move toward the plated layer 5, and hence, deposition of the electroplating proceeds with its growth direction being isotropic. Thus, a semispherical or semicylindrical plated layer can be formed. When the size of the opening 4 is sufficiently smaller than the size of the anodic plate 11 and metal ions are uniformly dissolved in the electroplating solution 10, the growth direction of the plated layer is isotropic. Typically, a microlens array has a structure of arrayed minute lenses each having a diameter from about 2 or 3 microns to about 200 or 300 microns, and the size of the opening is made smaller than the desired diameter of the microlens. In order to better achieve an isotropic growth of the plated or electrodeposited layer, the size of the opening is less than the diameter of the semispherical structure.

The plated layer is formed by the deposition of metal ions in the electroplating bath caused by the electrochemical reaction. The thickness of the plated layer can be readily controlled by controlling the electroplating time and temperature. The following materials can be used as electroplating metal. For example, as a single metal, Ni, Au, Pt, Cr, Cu, Ag, Zn and the like can be employed. As an alloy, Cu—Zn, Sn—Co, Ni—Fe, Zn—Ni and the like can be used. Any material can be used so long as electroplating is possible.

The first plated layer 5 can include a portion formed by electrodeposition or electroless plating. The surface of the first plated layer 5 only needs to be electrically conductive such that a second layer can be formed on this surface using electroplating or electrodeposition.

Figure 3E:
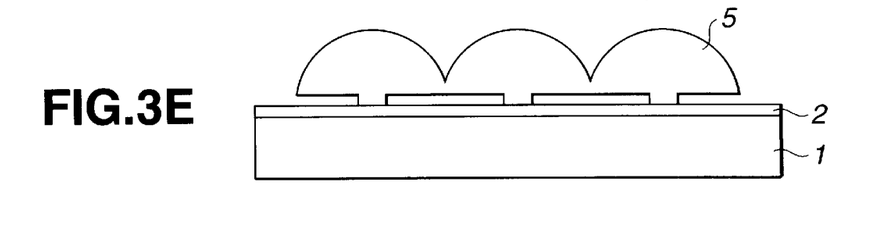

Turning now to processes of FIGS. 3A to 3F, the mask layer 3 is then removed by plasma ashing as illustrated in FIG. 3E. As the removal method, organic cleansing, inorganic cleansing, ultraviolet-ray ozone ashing, plasma ashing and so forth can be employed if only none of the substrate 1, electrode layer 2 and plated layer 5 are corroded thereby.

When the adjacent plated layers 5 are joined to each other, the mask layer 3 can be removed if the mask layer 3 is not completely covered with the first plated layers 5 (see FIG. 4). Thus, the mask layer 3 can be removed without residue.

Figure 3F:
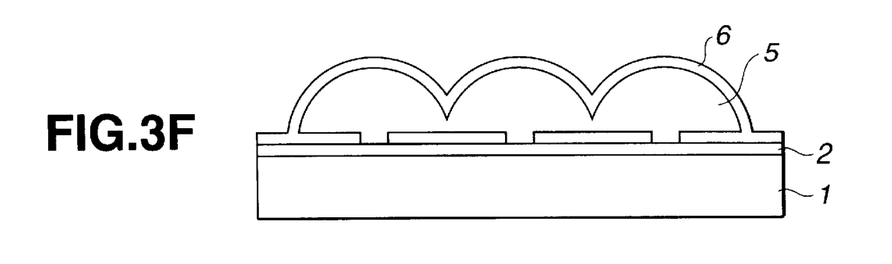

After that, another Ni electroplating is performed at a bath temperature of 50° C. and a cathodic current density of 5 A/dm$^2$. The same Ni electroplating bath containing nickel (II) sulfate, nickel (II) chloride, boric acid and brightener is used. A second plated layer 6 is thus grown until its radius reaches about 30 $\mu$m above the center of the opening 4 as illustrated in FIG. 3F. Thereby, a contact area between the semispherical plated layers 5 and 6 and the electrode layer 2 increases, and hence, the semispherical first plated layer 5 is firmly fixed to the electrode layer 2. In such a mold for forming a microlens array, there occurs neither mold deformation nor cracks due to the molding pressure when used, and excellent mechanical characteristics, such as a high shearing stress, can be obtained. Therefore, when a lens material layer or a mold material layer formed on the above structure is separated from this structure, the collapse of the first plated layer 5 can be prevented. Further, the first plated layer 5 does not drop even if a strong stirring plating is conducted to deposit the mold material layer on the above structure. Leveling is also achieved by the second plated layer 6, so that a plated surface with a large glossiness can be obtained. Furthermore, since a portion of the mask layer 3 between the first plated layer 6 and the electrode layer 2 is removed, the problem of deformation of the plated layers 5 and 6 due to thermal stress of the mask layer can be eliminated and a mold for forming a microstructure array with a high thermal resistivity can be obtained.

When the second plated layer 6 is formed, the forming method is preferably limited to electroplating since it can take metal ions even into narrow areas, since the second plated layer 6 needs to be formed in such a narrow area between the first plated or electrodeposited layer 5 and the electrode layer 2.

Figure 6A:
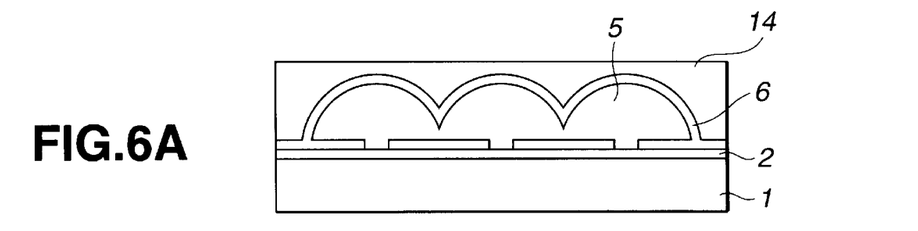
FIGS. 6A to 6D are cross-sectional views illustrating steps of a method for fabricating a microlens array mold according to the present invention, respectively.
Figure 6B:
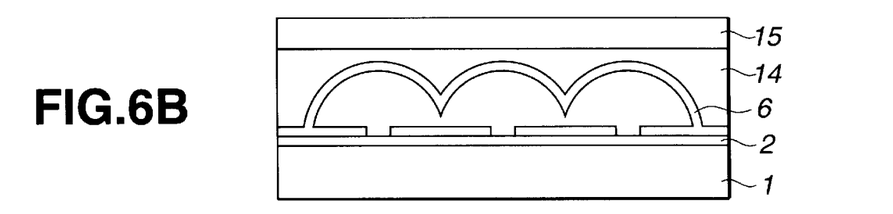
Figure 6C:
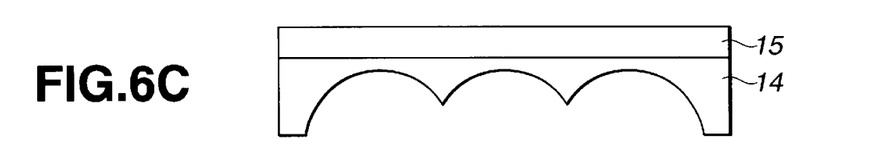

A fabrication process for forming a microlens array by using the above structure will be described with reference to FIGS. 6A to 6D. A resin 14 of ultraviolet-ray hardening photopolymer is deposited on the plated layers 5 and 6 as illustrated in FIG. 6A. After a support substrate 15 of glass is placed on the resin 14, the resin 14 is hardened by exposing the resin 14 to ultraviolet rays as illustrated in FIG. 6B. The resin 14 of a microlens array can be separated from the substrate 1 and the plated layers 5 and 6 by lifting the glass substrate 15. Thus, the concave resin 14 can be formed as illustrated in FIG. 6C. Here, a thousand photopolymer structures 14 for the microlens array could be formed by the same microlens array mold 1, 2 and 6, using the same method. During such a process, there was no collapse of the semispherical plated layers 5 and 6.

In the fabrication method for a mold for a microlens array according to this embodiment, the resistivity of the mold is increased, and a large number of the concave resins 14 with the same profile can be fabricated using the same mold.

Figure 6D:
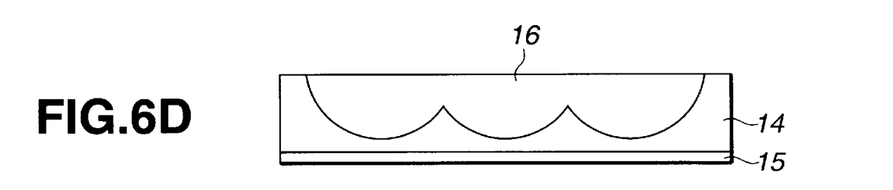

Another resin 16 with a larger refractive index than that of the resin 14 is further dropped on the concave resin 14, and the resin 16 is hardened. Thus, a plane microlens array as illustrated in FIG. 6D can be obtained.

In the above method, the alkaline glass is not indispensable for forming a microlens, so that materials which can be used for the microlens and the substrate are less restricted than in the ion exchange method.

The above microlens array may be fabricated by other methods, such as a method in which a conventional thermoplastic resin is used and a heated mold is stamped on this resin, a method in which a thermosetting resin is laid over a mold and then heated to be hardened, and a method in which an electron-beam hardening resin is coated on a mold and the resin is hardened by electron beam irradiation.

(Second Embodiment)

A second embodiment of a fabrication method of a semispherical microstructure array will be described by reference to FIGS. 3A to 3F, 5A to 5E and 7A to 7C.

Also in the second embodiment, substrate 1, electrode layer 2, insulating mask layer 3, openings 4 are formed as in the first embodiment.

A Cu (copper) electroplating is then performed at a bath temperature of 55° C. and a cathodic current density of 4 A/dm$^2$ as illustrated in FIG. 8. The above substrate 1 for electroplating is used as a base 9, and the electrode layer 2 is used as the cathode. A Cu electroplating bath containing copper sulfate, sulfuric acid, chloric acid and brightener is used. A Cu plated layer 5 is initially deposited in the opening 4 and grown therein. The plated layer 5 expands onto the mask insulating layer 3, and the semispherical microstructure 5 is thus formed as illustrated in FIG. 3D. The plated layer 5 is deposited until its radius reaches about 20 μm above a center of the opening 4.

The mask layer 3 is then removed by plasma ashing as illustrated in FIG. 3E. After that, Ni electroplating is performed at a bath temperature of 50° C. and a cathodic current density of 5 A/dm$^2$. Ni electroplating bath containing nickel (II) sulfate, nickel (II) chloride, boric acid and brightener is used. A second plated layer 6 is thus grown until its radius reaches about 25 μm above the center of the opening 4 as illustrated in FIG. 3F. Thereby, a contact area between the semispherical plated layers 5 and 6 and the electrode layer 2 increases, and hence, the semispherical first plated layer 5 is firmly fixed to the electrode layer 2. Also in such a mold for forming a microlens array, there occur neither mold deformation nor cracks due to the molding pressure when used, and excellent mechanical characteristics can be obtained.

Figure 5A:
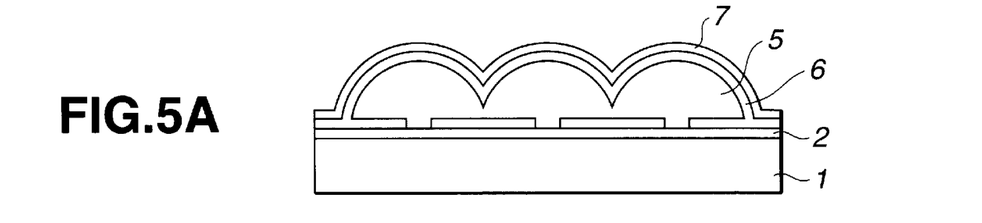
FIGS. 5A to 5E are cross-sectional views illustrating steps of a method for fabricating a microlens array mold according to the present invention, respectively.
Figure 5B:
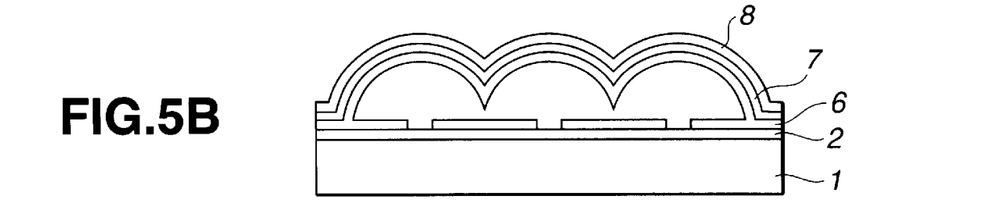

A process for fabricating a mold for forming a microlens array will be described by reference to FIGS. 5A to 5E. The above structure is used as a master. PSG (phospho-silicate glass) of 1 μm in thickess is deposited at 350° C. by an atmospheric-pressure chemical vapor deposition (CVD) method to form a sacrificial layer 7 as illustrated in FIG. 5A. Ti and Au are continuously layered with thicknesses of 10 nm and 200 nm on the above wafer, respectively, using the electron-beam evaporation method. An electrode layer 8 for electroplating the mold is thus formed as illustrated in FIG. 5B.

Figure 5C:
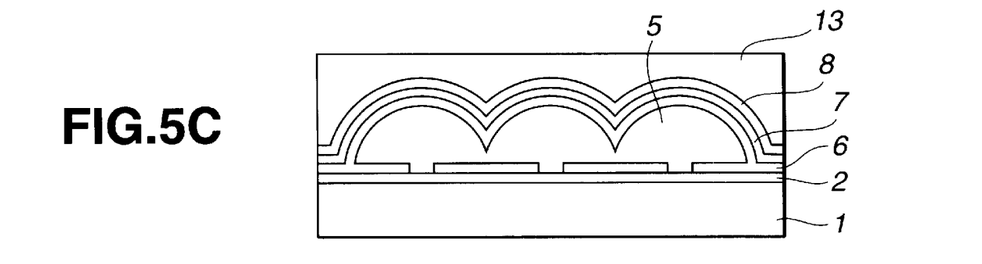

Ni electroplating is then performed at a bath temperature of 50° C. and a cathodic current density of 5 A/dm$^2$ as illustrated in FIG. 5C. The above master is used as a base, and the above electrode layer 8 is used as the cathode. Ni electroplating bath containing nickel (II) sulfate, nickel (II) chloride, boric acid and brightener is used. Thus, a concave mold 13 is formed as illustrated in FIG. 5C.

Figure 5D:
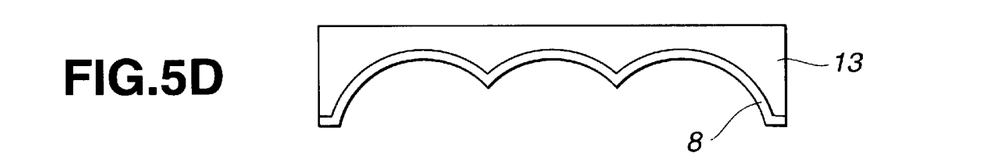
Figure 5E:
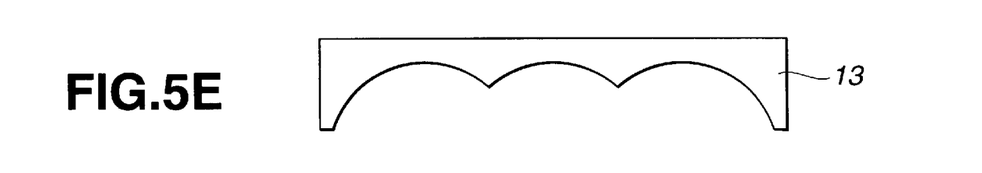

The wafer of FIG. 5C is then immersed in a mixture solution of hydrofluoric acid and ammonium fluoride to etch and remove the sacrificial layer 7 of PSG. The substrate 1 and the mold 13 can be separated from each other as illustrated in FIG. 5D. The Ti of the electrode layer 8 for electroplating the mold can be removed simultaneously. After that, the Au of the electrode layer 8 is etched by a mixture solution of iodine and potassium iodide. The mold 13 for a convex microlens array can be thus produced as illustrated in FIG. 5E.

The separated substrate has a semispherical microstructure. Here, a thousand molds 13 for a microlens array could be formed by repeating the same steps as illustrated in FIGS. 5A to 5E. During such a process, there was no collapse of the semispherical plated layers 5 and 6.

In the fabrication method of the mold for a microlens array according to this embodiment, a plurality of molds 13 with the same profile can be readily fabricated since the mold 13 is formed by molding. In this embodiment, the resistivity of the mold master is increased, and a plurality of molds for a microlens array with the same profile can be fabricated using the same mold master.

Figure 7A:
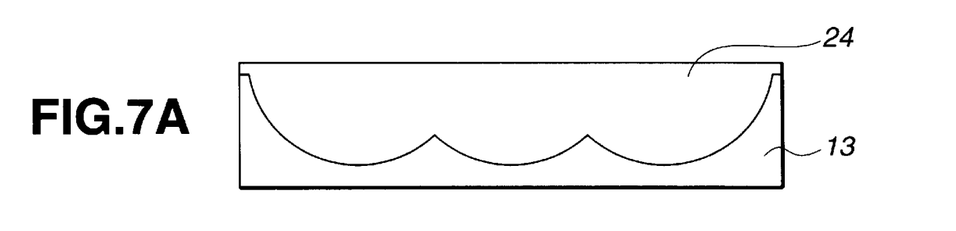
FIGS. 7A to 7C are cross-sectional views illustrating steps of a method for fabricating a microlens array mold according to the present invention, respectively.
Figure 7B:
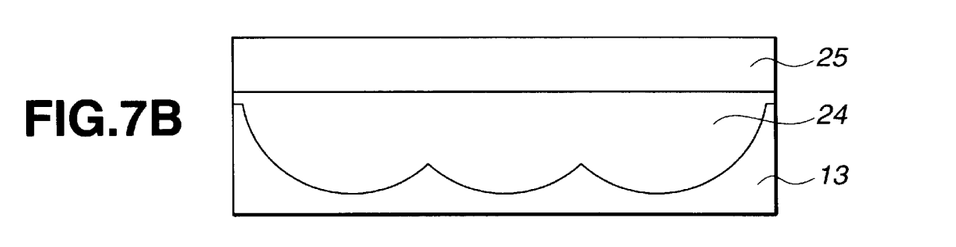
Figure 7C:
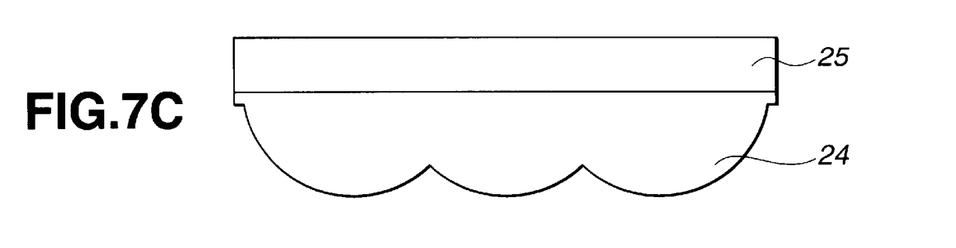

After ultraviolet-ray hardening resin of photopolymer 24 is laid over the mold 13 for a convex microlens array fabricated by the above method, as illustrated in FIG. 7A. A glass substrate 25 as a supporting substrate is then placed on the resin 24 as illustrated in FIG. 7B. The resin 24 is exposed to ultraviolet rays through the glass 25 to be hardened. After that, the glass 25 with the resin 24 is separated from the mold 13. Thus, a convex microlens array with a large glossiness is obtained as illustrated in FIG. 7C. A thousand microlens arrays of photopolymer could be formed by repeating the same steps as illustrated in FIGS. 7A to 7C, using the same mold 13 for a microlens array.

The above microlens array may also be fabricated by other methods, such as the above-described methods using thermoplastic resins, thermosetting resins and electron-beam hardening resins.

(Third Embodiment)

A third embodiment of a method of fabricating a semispherical microstructure array will be described by reference to FIGS. 3A to 3F, 5A to 5E and 7A to 7C.

Initially, a silicon wafer of 1 inch in diameter is thermally oxidized using an oxidizing gas, and layers of silicon dioxide with a thickness of 1 μm are formed on opposite surfaces of the wafer. This wafer is used as a substrate 1 illustrated in FIGS. 3A to 3F. Cr is layered with a thickness of 200 nm on the above wafer, using the electron beam vacuum-evaporation method. An electrode layer 2 of Cr is thus formed. Aromatic polyamide acid solution is then spin-coated and this coating is thermally treated to form a mask layer 3 of polyimide with a thickness of 1 μm as illustrated in FIG. 3A.

Further, coating, exposure and development of photoresist are conventionally performed using photolithography to form an opening in the resist on the mask layer 3. The mask layer 3 at the resist opening is etched by the reactive ion etching using oxygen. Thus, the electrode layer 2 is partly exposed through the mask layer 3 and an opening 4 is formed as illustrated in FIG. 3B. The photoresist formed on the mask layer 3 is removed thereafter.

As formed, the opening 4 has a circular shape and a diameter of 5 μm. A plurality of the openings 4 are formed in a two-dimensional matrix array of 500×500. Intervals between the adjacent openings 4 are 50 μm.

A Cr (chromium) electroplating is then performed at a bath temperature of 45° C. and a cathodic current density of 20 A/dm$^2$ as illustrated in FIG. 8. The above substrate 1 for electroplating is used as a base 9, and the electrode layer 2 is used as the cathode. A Cr electroplating bath containing chromic acid and sulfuric acid is used. A Cr plated layer 5 is initially deposited in the opening 4 and grew therein. The plated layer 5 expands onto the mask layer 3, and the semispherical microstructure 5 is thus formed as illustrated in FIG. 3D. The plated layer 5 is deposited until its radius reaches about 12 μm above a center of the opening 4.

The mask layer 3 is then removed by plasma ashing as illustrated in FIG. 3E. After that, another Cr electroplating is performed at a bath temperature of 45° C. and a cathodic current density of 20 A/dm². A Cr electroplating bath containing sulfuric acid and brightener is used. A second plated layer 6 is thus grown until its radius reaches about 20 µm above the center of the opening 4 as illustrated in FIG. 3F. Thereby, the semispherical first plated layer 5 is firmly fixed to the electrode layer 2. In such a mold for forming a microlens array, there occur neither mold deformation nor cracks due to the molding pressure when used, and a mold master for a microlens array with excellent mechanical characteristics can be obtained.

A fabrication process for a mold will be described by reference to FIGS. 5A to 5E. The above structure is used as a master. PSG of 1 µm in thickess is deposited at 350° C. by the atmospheric-pressure CVD method to form a sacrificial layer 7 as illustrated in FIG. 5A.

Ni electroless plating is then performed at a bath temperature of 90° C. Ni electroless plating bath containing nickel (II) sulfate, ethylene diamine, sodium hypophosphite and additive is used. Thus, a mold 13 is formed as illustrated in FIG. 5C.

The wafer of FIG. 5C is then immersed in a mixture solution of hydrofluoric acid and ammonium fluoride to etch and remove the sacrificial layer 7 of PSG. The substrate 1 and the mold 13 can be separated as illustrated in FIG. 5D. Since the electroless plating is used in this embodiment, the process for forming the electrode layer 8 on the sacrificial layer 7 is unnecessary, in contrast to the second embodiment.

The separated substrate has a semispherical microstructure. Here, a thousand molds 13 for forming a microlens array could be formed by repeating the same steps as illustrated in FIGS. 5A to 5E. During such a process, there was no collapse of the semispherical plated layers 5 and 6.

In the fabrication method of the mold for forming a microlens array according to this embodiment, a plurality of molds 13 with the same profile can be readily fabricated since the mold 13 is formed by molding. In this embodiment, the resistivity of the mold master is increased, and a plurality of molds for a microlens array with the same profile can be fabricated using the same mold master.

After ultraviolet-ray hardening resin of photopolymer 24 is laid over the mold 13 for a convex microlens array fabricated by the above method as illustrated in FIG. 7A. A glass substrate 25 as a supporting substrate is then placed on the resin 24 as illustrated in FIG. 7B. The resin 24 is exposed to ultraviolet rays through the glass 25 to be hardened. After that, the glass 25 with the resin 24 is separated from the mold 13. Thus, a convex microlens array with a high glossiness is obtained as illustrated in FIG. 7C. A thousand microlens arrays of photopolymer could be formed by repeating the same steps as illustrated in FIGS. 7A to 7C, using the same mold 13 for a microlens array.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A method for fabricating an array of microstructures comprising the steps of:

preparing a substrate with an electrically-conductive portion;

forming an insulating mask layer on the electrically-conductive portion;

forming a plurality of openings in the insulating mask layer to expose the electrically-conductive portion;

forming a first plated or electrodeposited layer in the openings and on the insulating mask layer by electro- or electroless-plating, or electrodeposition, with at least a surface of the first plated or electrodeposited layer being electrically conductive;

removing the insulating mask layer; and forming a second plated layer on the first plated or electrodeposited layer and on the electrically-conductive portion by electroplating, wherein the step of forming the first plated or electrodeposited layer is stopped after a thickness of the first plated or electrodeposited layer reaches half a designed final height or more of the second plated layer above a central portion of the opening.

* * * * *

UNITED STATES PATENT AND TRADEMARK OFFICE
CERTIFICATE OF CORRECTION

PATENT NO.    : 6,503,384 B1
DATED         : January 7, 2003
INVENTOR(S)   : Takayuki Teshima et al.

It is certified that error appears in the above-identified patent and that said Letters Patent is hereby corrected as shown below:

Title page,
Item [56], References Cited, FOREIGN PATENT DOCUMENTS,
"89010169" should read -- 64-10169 --;
"1261601" should read -- 1-261601 --;
"5303009" should read -- 5-303009 --; and
"6027302" should read -- 6-27302 --.

Column 8,
Line 1, "if only none" should read -- if none --.

Signed and Sealed this

Ninth Day of December, 2003

JAMES E. ROGAN
*Director of the United States Patent and Trademark Office*